(12) United States Patent
Kim et al.

(10) Patent No.: US 11,657,968 B2
(45) Date of Patent: May 23, 2023

(54) MULTILAYER CAPACITOR AND BOARD HAVING THE SAME

(71) Applicant: SAMSUNG ELECTRO-MECHANICS CO., LTD., Suwon-si (KR)

(72) Inventors: Hyung Joon Kim, Suwon-si (KR); Jung Ho Shim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/231,107

(22) Filed: Apr. 15, 2021

(65) Prior Publication Data

US 2022/0165494 A1    May 26, 2022

(30) Foreign Application Priority Data

Nov. 25, 2020 (KR) .................. 10-2020-0159975

(51) Int. Cl.
*H01G 4/012* (2006.01)
*H01G 4/30* (2006.01)
(Continued)

(52) U.S. Cl.
CPC .............. *H01G 4/012* (2013.01); *H01G 2/065* (2013.01); *H01G 4/008* (2013.01);
(Continued)

(58) Field of Classification Search
CPC ........ H01G 4/012; H01G 2/065; H01G 4/008; H01G 4/1209; H01G 4/232; H01G 4/30; H01G 4/005
(Continued)

(56) References Cited

U.S. PATENT DOCUMENTS

| 2008/0013248 A1* | 1/2008 | Togashi | ................. | H01G 4/232 |
| | | | | 361/303 |
| 2008/0123248 A1* | 5/2008 | Kunishi | .................. | C25D 7/00 |
| | | | | 361/306.3 |

(Continued)

FOREIGN PATENT DOCUMENTS

JP          2011018758 A  *  1/2011
KR   10-2014-0050210 A      4/2014
(Continued)

*Primary Examiner* — Arun Ramaswamy
(74) *Attorney, Agent, or Firm* — Morgan, Lewis & Bockius LLP (57) ABSTRACT

A multilayer capacitor includes: a capacitor body including first and second dielectric layers, internal electrodes, and including first to six surfaces; first and second external electrodes disposed on the third and fourth surfaces, respectively; and third and fourth external electrodes disposed on the fifth and sixth surfaces, respectively. The internal electrodes include: first internal electrode disposed on the first dielectric layer, having both ends connected to the first and second external electrodes, respectively, and having a hole; a second internal electrode disposed on the second dielectric layer so as to overlap a portion of the first internal electrode and be connected to the third external electrode; and a third internal electrode disposed on the second dielectric layer so as to overlap a portion of the first internal electrode, be spaced apart from the second internal electrode, and be connected to the fourth external electrode.

24 Claims, 7 Drawing Sheets

(51) Int. Cl.
*H01G 2/06* (2006.01)
*H01G 4/008* (2006.01)
*H01G 4/232* (2006.01)
*H01G 4/12* (2006.01)

(52) U.S. Cl.
CPC ........... *H01G 4/1209* (2013.01); *H01G 4/232* (2013.01); *H01G 4/30* (2013.01)

(58) Field of Classification Search
USPC ............ 361/321.2, 301.4, 303, 306.3, 321.3, 361/321.1
See application file for complete search history.

(56) References Cited

U.S. PATENT DOCUMENTS

| | | | | |
|---|---|---|---|---|
| 2009/0059469 | A1* | 3/2009 | Lee | H01G 4/385 |
| | | | | 361/313 |
| 2017/0208690 | A1* | 7/2017 | Martinez | H01G 4/232 |
| 2017/0316882 | A1 | 11/2017 | Park et al. | |
| 2019/0148073 | A1* | 5/2019 | Lee | H01G 4/30 |
| | | | | 361/306.3 |
| 2020/0203720 | A1* | 6/2020 | Shiode | B32B 5/30 |

FOREIGN PATENT DOCUMENTS

| | | | | |
|---|---|---|---|---|
| KR | 10-2017-0122579 A | | 11/2017 | |
| WO | WO-2007054082 A1 * | | 5/2007 | ........... H01C 7/1006 |

\* cited by examiner

MULTILAYER CAPACITOR AND BOARD HAVING THE SAME

CROSS-REFERENCE TO RELATED APPLICATION(S)

This application claims benefit of priority to Korean Patent Application No. 10-2020-0159975 filed on Nov. 25, 2020 in the Korean Intellectual Property Office, the disclosure of which is incorporated herein by reference in its entirety.

TECHNICAL FIELD

The present disclosure relates to a multilayer capacitor and a board having the same.

BACKGROUND

Multilayer capacitors are electronic components used in electronic devices in various fields.

Such multilayer capacitors may be classified into a high voltage-type multilayer capacitor, a low equivalent series inductance (ESL)-type multilayer capacitor, an embedded multilayer capacitor, or an improved warpage strength-type multilayer capacitor according to electrical characteristics thereof.

In addition, recent multilayer capacitors have been required to have low ESL in order to significantly reduce ripples in a power supply current.

SUMMARY

An aspect of the present disclosure may provide a multilayer capacitor in which equivalent series inductance (ESL) characteristics may be implemented, and a board having the same.

According to an aspect of the present disclosure, a multilayer capacitor may include: a capacitor body including first and second dielectric layers, alternately stacked with a plurality of internal electrodes interposed therebetween, and including first and second surfaces opposing each other, third and fourth surfaces connected to the first and second surfaces and opposing each other, and fifth and sixth surfaces connected to the first and second surfaces, connected to the third and fourth surfaces, and opposing each other; first and second external electrodes disposed on the third and fourth surfaces of the capacitor body, respectively; and third and fourth external electrodes disposed on the fifth and sixth surfaces of the capacitor body, respectively. The internal electrodes may include: first internal electrode disposed on the first dielectric layer, having both ends connected to the first and second external electrodes, respectively, and having a hole; a second internal electrode disposed on the second dielectric layer so as to overlap a portion of the first internal electrode and be connected to the third external electrode; and a third internal electrode disposed on the second dielectric layer so as to overlap a portion of the first internal electrode, be spaced apart from the second internal electrode, and be connected to the fourth external electrode.

In the first internal electrode, the hole may be elongated towards the third and fourth surfaces of the capacitor body.

A position in which the hole is disposed in the first dielectric layer and a position in which the second and third internal electrodes are spaced apart from each other on the second dielectric layer may at least partially overlap each other in a direction in which the first and second dielectric layers are stacked.

The first internal electrode may include first and second lead portions disposed at both ends thereof, respectively, and extending to be connected to the first and second external electrodes, respectively.

The first internal electrode may have first and second groove portions disposed at both front ends thereof, respectively, in a direction toward the fifth and sixth surface of the capacitor body.

The first internal electrode may have at least one cut-out portions disposed in portions thereof exposed to the third and fourth surfaces of the capacitor body, respectively.

The first internal electrode may have a cut-out portion disposed at at least one corner thereof.

The second internal electrode may include: a first body portion overlapping a portion of the first internal electrode; and a third lead portion extending from the first body portion toward the fifth surface of the capacitor body.

The third internal electrode may include: a second body portion overlapping a portion of the first internal electrode; and a fourth lead portion extending from the second body portion toward the sixth surface of the capacitor body.

The first and second external electrodes may extend from the third and fourth surfaces of the capacitor body to parts of the first and second surfaces of the capacitor body, and the third and fourth external electrodes may extend from the fifth and sixth surfaces of the capacitor body to parts of the first and second surfaces of the capacitor body.

The first to fourth external electrodes may include plating layers disposed on surfaces thereof, respectively.

The hole may be spaced apart from outer edges of the first internal electrode.

According to another aspect of the present disclosure, a multilayer capacitor may include: a capacitor body including first and second dielectric layers, alternately stacked with a plurality of internal electrodes interposed therebetween, and including first and second surfaces opposing each other, third and fourth surfaces connected to the first and second surfaces and opposing each other, and fifth and sixth surfaces connected to the first and second surfaces, connected to the third and fourth surfaces, and opposing each other; first and second external electrodes disposed on the third and fourth surfaces of the capacitor body, respectively; and third and fourth external electrodes disposed on the fifth and sixth surfaces of the capacitor body, respectively. The internal electrodes may include: a first internal electrode disposed on the first dielectric layer, including first and second lead portions disposed at both ends thereof, respectively, and extending to be connected to the first and second external electrodes, respectively, having first and second groove portions disposed at both front ends thereof, respectively, in a direction towards the fifth and sixth surface of the capacitor body, and having at least one cut-out portions disposed in portions thereof exposed to the third and fourth surfaces of the capacitor body, respectively; a second internal electrode disposed on the second dielectric layer so as to overlap a portion of the first internal electrode and be connected to the third external electrode; and a third internal electrode disposed on the second dielectric layer so as to overlap a portion of the first internal electrode, be spaced apart from the second internal electrode, and be connected to the fourth external electrode.

According to another aspect of the present disclosure, a board having a multilayer capacitor may include: a substrate having a plurality of electrode pads disposed on an upper surface thereof; and the multilayer capacitor as described above mounted on the substrate so that respective corresponding external electrodes are connected to the electrode pads.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Directions of a hexahedron will be defined in order to clearly describe exemplary embodiments in the present disclosure. X, Y and Z in the drawings refer to a length direction, a width direction, and a thickness direction of a capacitor body, respectively. Here, the thickness direction may be used as the same concept as a stacked direction in which first and second dielectric layers are stacked.

Figure 1:
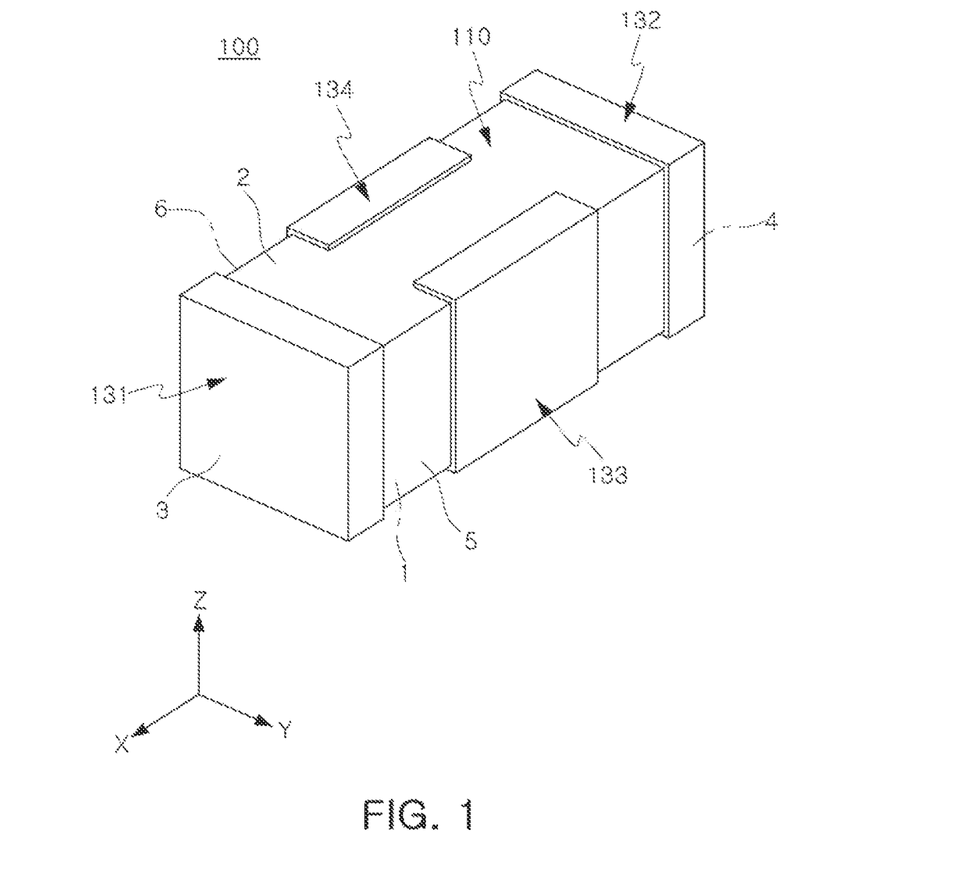
FIG. 1 is a schematic perspective view illustrating a multilayer capacitor according to an exemplary embodiment in the present disclosure.
Figure 2A:
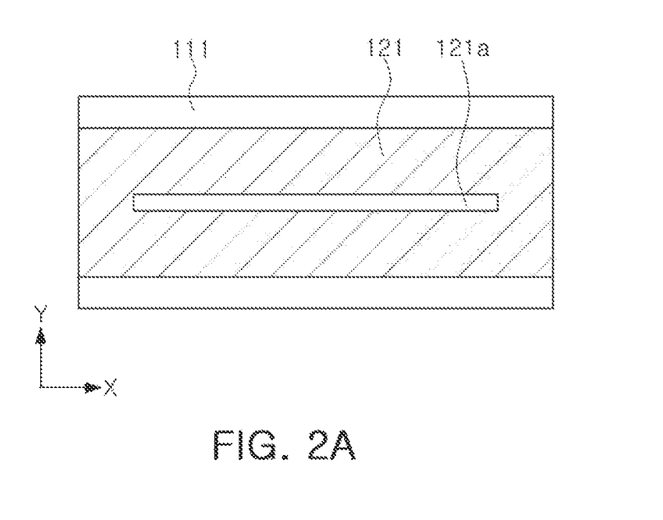
FIGS. 2A and 2B are plan views illustrating structures of internal electrodes used in the multilayer capacitor of FIG. 1.
Figure 2B:
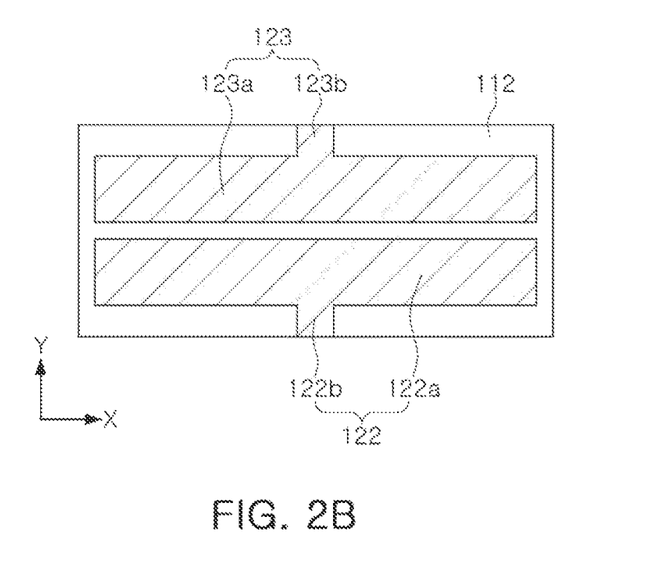
Figure 3:
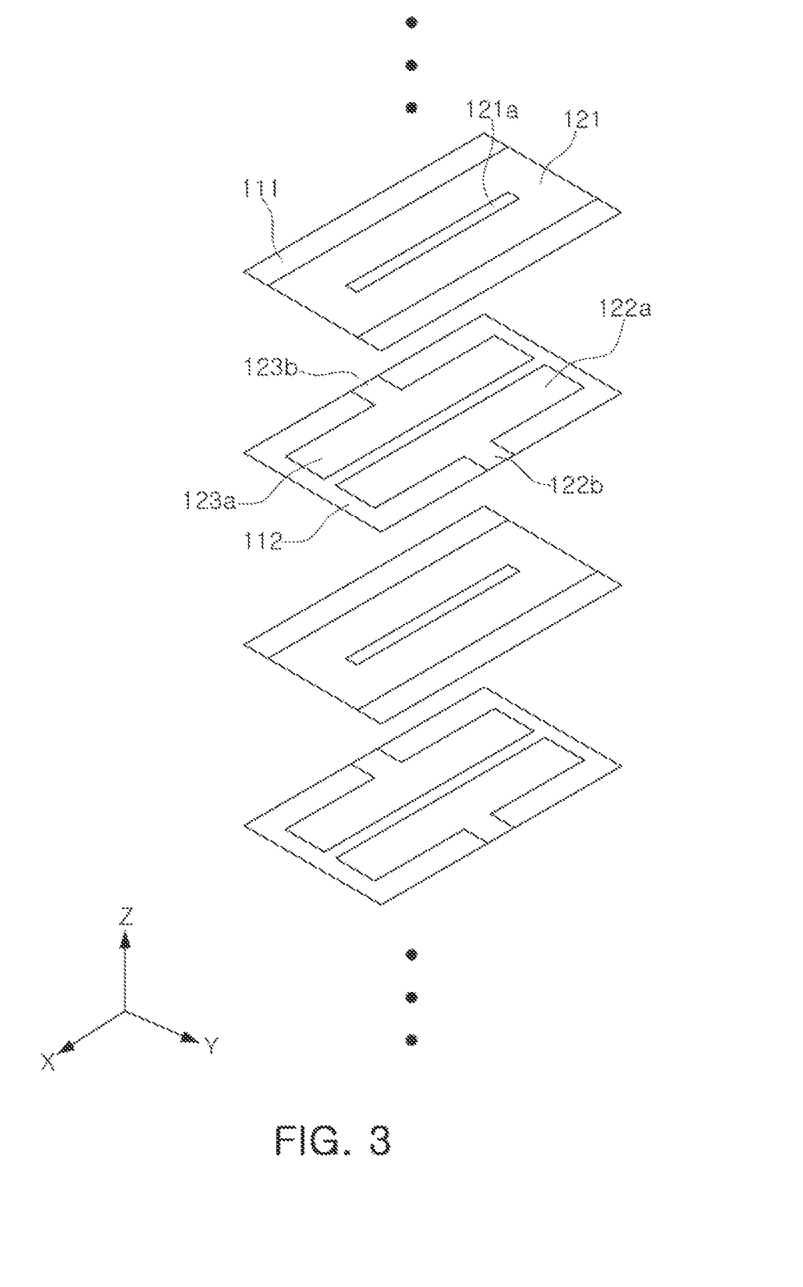
FIG. 3 is an exploded perspective view illustrating a stacked structure of first and second dielectric layers in the multilayer capacitor of FIG. 1.

FIG. 1 is a schematic perspective view illustrating a multilayer capacitor according to an exemplary embodiment in the present disclosure, FIGS. 2A and 2B are plan views illustrating structures of internal electrodes used in the multilayer capacitor of FIG. 1, and FIG. 3 is an exploded perspective view illustrating a stacked structure of first and second dielectric layers in the multilayer capacitor of FIG. 1.

Referring to FIGS. 1 through 3, a multilayer capacitor 100 according to an exemplary embodiment in the present disclosure may include a capacitor body 110, a plurality of internal electrodes, and first to fourth external electrodes 131 to 134.

The capacitor body 110 may include a plurality of first and second dielectric layers 111 and 112 that are alternately stacked, and a shape of the capacitor body 110 is not particularly limited, but may be a substantially hexahedral shape as illustrated in FIG. 1.

The capacitor body 110 may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other in the Y direction.

However, a shape and a dimension of the capacitor body 110 and the numbers of stacked first and second dielectric layers 111 and 112 are not limited to those illustrated in the drawings of the present exemplary embodiment.

In this case, the first and second dielectric layers 111 and 112 may be in a sintered state, and adjacent first and second dielectric layers 111 and 112 may be integrated with each other so that boundaries therebetween are not readily apparent without using a scanning electron microscope (SEM).

The first and second dielectric layers 111 and 112 may include a ceramic material having a high dielectric constant, for example, barium titanate ($BaTiO_3$)-based ceramic powders, strontium titanate ($SrTiO_3$)-based ceramic powders, or the like. However, a material of each of the first and second dielectric layers 111 and 112 is not limited thereto as long as sufficient capacitance may be obtained.

In addition, the first and second dielectric layers 111 and 112 may further include a ceramic additive, an organic solvent, a plasticizer, a binder, a dispersant, and the like, if necessary, in addition to the ceramic powders described above.

As the ceramic additive, for example, a transition metal oxide or a transition metal carbide, a rare earth element, magnesium (Mg), aluminum (Al), or the like, may be used.

The plurality of internal electrodes may be disposed in the capacitor body 110 so as to be spaced apart from each other with each of the first and second dielectric layers 111 and 112 interposed therebeween.

In the present exemplary embodiment, the internal electrodes may include first to third internal electrodes 121 to 123.

In this case, the first internal electrode 121 may be disposed on the first dielectric layer 111, the second and third internal electrodes 122 and 123 may be disposed on one second dielectric layer 112 so as to be spaced apart from each other, and the first and second dielectric layers 111 and 112 may be alternately disposed in the Z direction.

In this case, the first internal electrode 121 may be an electrode connected to a signal terminal, and the second and third internal electrodes 122 and 123 may be electrodes connected to a ground (GND) terminal.

In addition, the capacitor body 110 may include an active region, which contributes to forming capacitance of the multilayer capacitor, and upper and lower cover regions formed as upper and lower margin portions on upper and lower surfaces of the active region, respectively, in the Z direction.

The upper and lower cover regions may be formed of the same material as the first and second dielectric layers 111 and 112 and have the same configuration as the first and second dielectric layers 111 and 112 except that they do not include the internal electrodes.

The upper and lower cover regions may be formed by stacking a single dielectric layer or two or more first or second dielectric layers 111 and 112 on the upper and lower surfaces of the active region, respectively, in the Z direction, and may basically serve to prevent damage to the internal electrodes due to physical or chemical stress.

The multilayer capacitor 100 according to the present exemplary embodiment may include the first to fourth external electrodes 131 to 134 formed outer surfaces of the capacitor body 110 and selectively electrically connected to the internal electrodes.

The first and second external electrodes 131 and 132 may be disposed on the third and fourth surfaces 3 and 4 of the capacitor body 110, respectively.

Both end portions of first internal electrodes 121 to be described later may be electrically connected to the first and second external electrodes 131 and 132, respectively.

In this case, the first and second external electrodes 131 and 132 may extend to parts of the first and second surfaces 1 and 2 of the capacitor body 110.

In addition, the first and second external electrodes 131 and 132 may further extend to parts of the fifth and sixth surfaces 5 and 6 of the capacitor body 110, if necessary.

The third and fourth external electrodes 133 and 134 may be disposed on the fifth and sixth surfaces 5 and 6 of the capacitor body 110, respectively.

The third internal electrodes 122 may be electrically connected to the third external electrode 133, and the fourth internal electrodes 123 may be electrically connected to the fourth external electrode 134.

In this case, the third and fourth external electrodes 133 and 134 may extend to parts of the first and second surfaces 1 and 2 of the capacitor body 110.

In addition, the third and fourth external electrodes 133 and 134 may be disposed to be spaced apart from the third and fourth surfaces 3 and 4 of the capacitor body 110 by predetermined intervals so as not to be in contact with the first and second external electrodes 131 and 132.

The first to fourth external electrodes 131 to 134 may be formed of a conductive paste including a conductive metal.

The conductive metal may be nickel (Ni), copper (Cu), tin (Sn), or alloys thereof, but is not limited thereto.

In addition, a method of forming the first to fourth external electrodes 131 to 134 is not particularly limited. For example, the first to fourth external electrodes 131 to 134 may be formed by dipping the capacitor body 110 in a conductive paste or may be formed by another method such as sputtering, plating or the like.

In addition, plating layers may be formed on surfaces of the first to fourth external electrodes 131 to 134, respectively.

The plating layer may include a nickel plating layer formed on each of the first to fourth external electrodes 131 to 134 and a tin plating layer formed on the nickel plating layer.

The first internal electrode 121 may be disposed on the first dielectric layer 111, and may have both ends exposed to the third and fourth surfaces 3 and 4 of the capacitor body 110, respectively, to be connected to the first and second external electrodes 131 and 132.

In addition, a hole 121a may be formed inside the first internal electrode 121.

The hole 121a may be formed to be elongated in the X direction in approximately the middle of the first internal electrode in the Y direction.

Such a hole 121a may divide the first internal electrode 121 into two regions to provide the same effect as an effect as if dual capacitors are connected to each other in parallel. In one example, the hole 121a may not extend completely through the first internal electrode 121 in the X direction. That is, one or both of opposing ends of the first internal electrode 121 in the X direction may not be separated by the hole 121a. In this case, the two regions of the first internal electrode 121, separated by the hole 121a, may still be connected at one or both of the opposing ends of the first internal electrode 121 in the X direction. In one example, the hole 121a may be an inner hole spaced apart from outer edges of the first internal electrode 121.

In this case, the hole 121a may have a width enough for the first internal electrode 121 to be electrically separated into two electrodes.

In addition, a shape of the hole 121a of the first internal electrode 121 is not limited to that illustrated in FIG. 2, and may be modified into various shapes.

The second internal electrode 122 may be disposed on the second dielectric layer 112, and may be exposed through the fifth surface 5 of the capacitor body 110 to be connected to the third external electrode 133.

The second internal electrode 122 may overlap a portion of the first internal electrode 121 in the Z direction.

In this case, the second internal electrode 122 may include a first body portion 122a and a third lead portion 122b.

The first body portion 122a may overlap a portion of the first internal electrode 121 in the Z direction.

The third lead portion 122b may extend from the first body portion 122a toward the fifth surface 5 of the capacitor body 110 so as to be exposed through the fifth surface 5 of the capacitor body 110 and be connected to the third external electrode 133.

The third internal electrode 123 may be disposed on the second dielectric layer 112 so as to be spaced apart from the second internal electrode 122 in the Y direction, and may be exposed through the sixth surface 6 of the capacitor body 110 to be connected to the fourth external electrode 134.

The third internal electrode 123 may overlap a portion of the first internal electrode 121 in the Z direction.

In this case, the third internal electrode 123 may include a second body portion 123a and a fourth lead portion 123b.

The second body portion 123a may overlap a portion of the first internal electrode 121 in the Z direction.

The fourth lead portion 123b may extend from the second body portion 123a toward the sixth surface 6 of the capacitor body 110 so as to be exposed through the sixth surface 6 of the capacitor body 110 and be connected to the fourth external electrode 134.

In this case, the third internal electrode 123 may form a symmetrical structure with the second internal electrode 122 in the Y direction.

In addition, a position in which the hole 121a is formed in the first dielectric layer 111 and a position in which the second and third internal electrodes 122 and 123 are spaced apart from each other in the Y direction on the second dielectric layer 112 may overlap each other in the Z direction.

According to such a structure, in the present exemplary embodiment, the first internal electrode 121 may be divided into two regions in the Y direction by the hole 121a, a right region of the first internal electrode 121 in the Y direction may overlap the first body portion 122a of the second internal electrode 122, and a left region of the first internal electrode 121 in the Y direction may overlap the second body portion 123a of the third internal electrode 123.

When the third external electrode 133 is connected to the third lead portion 122b of the second internal electrode 122 and the fourth external electrode 134 is connected to the fourth lead portion 123b of the third internal electrode 123 in such a state, the multilayer capacitor according to the present exemplary embodiment may have a structure in which a total of four capacitors are connected to each other in parallel unlike a multilayer capacitor according to the related art in which the hole is not formed in the first internal electrode and the second and third internal electrodes are formed as one electrode.

According to such a structure, equivalent series inductance (ESL) parasitically generated in the multilayer capacitor may be significantly reduced by ½.

The first to third internal electrodes 121 to 123 may be formed of a conductive paste including a conductive metal.

The first to third internal electrodes 121 to 123 may be formed using a conductive paste formed of one or more of, for example, a noble metal material such as platinum (Pt), palladium (Pd), a palladium-silver (Pd—Ag) alloy, or the like, nickel (Ni), and copper (Cu) as the conductive metal, but are not limited thereto.

In this case, a method of printing the conductive paste may be a screen printing method, a gravure printing method or the like, but is not limited thereto.

Figure 4:
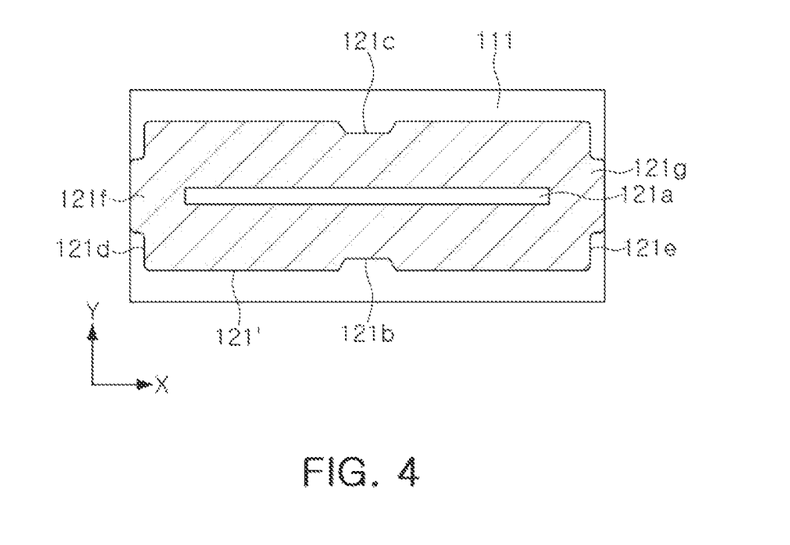
FIG. 4 is a plan view illustrating a first internal electrode according to another exemplary embodiment.

FIG. 4 is a plan view illustrating a first internal electrode according to another exemplary embodiment.

Referring to FIG. 4, a first internal electrode 121' may have at least one first cut-out portion 121d formed in a portion thereof exposed to the third surface 3 of the capacitor body 110.

In this case, the first cut-out portion 121d may be formed at a corner of the portion of the first internal electrode 121' exposed to the third surface 3 of the capacitor body 110.

The first cut-out portion 121d may be formed at each of both corners of the first internal electrode 121' in the Y direction or may be formed at only one corner of the first internal electrode 121' in the Y direction in some cases.

In addition, the first internal electrode 121' may have at least one second cut-out portion 121e formed in a portion thereof exposed to the fourth surface 4 of the capacitor body 110.

In this case, the second cut-out portion 121e may be formed at a corner of the portion of the first internal electrode 121' exposed to the fourth surface 4 of the capacitor body 110.

The second cut-out portion 121e may be formed at each of both corners of the first internal electrode 121' in the Y direction or may be formed at only one corner of the first internal electrode 121' in the Y direction in some cases.

Expressing such a structure differently, one end of the first internal electrode 121' in the X direction may be formed as a first lead portion 121f having one end extending toward the third surface 3 of the capacitor body 110 in the X direction and connected to the first external electrode 131, and the other end of the first internal electrode 121' in the X direction may be formed as a second lead portion 121g extending toward the fourth surface 4 of the capacitor body 110 and connected to the second external electrode 132.

In addition, shapes of the first cut-out portion 121d and the second cut-out portion 121e of the first internal electrode 121' are not limited to those illustrated in FIG. 4, and may be modified into various shapes.

In addition, the first internal electrode 121' may have first and second groove portions 121b and 121c formed at both front ends thereof in the Y direction, respectively.

In this case, the first and second groove portions 121b and 121c may be formed at positions overlapping the third lead portion 122b of the second internal electrode 122 and the fourth lead portion 123b of the third internal electrode 123 in the Z direction, respectively.

The first groove portion 121b and the second groove portion 121c may serve to prevent the third lead portion 122b and the fourth lead portion 123b from being in contact with one side surface and the other side surface of the first internal electrode 121' by the third external electrode 133 and the fourth external electrode 134, respectively, at the time of manufacturing the multilayer capacitor to lower a short circuit occurrence rate.

In addition, shapes of the first groove portion 121b and the second groove portion 121c of the first internal electrode 121' are not limited to those illustrated in FIG. 4, and may be modified into various shapes.

Figure 9:
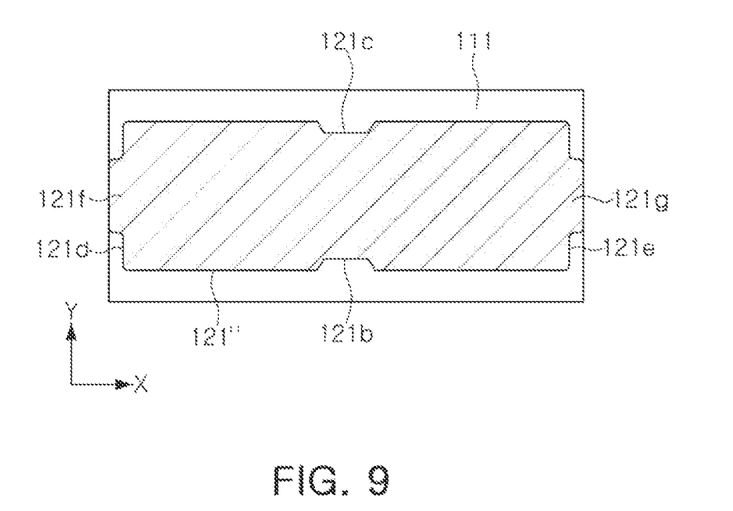
FIG. 9 is a plan view illustrating a first internal electrode according to another exemplary embodiment.

Meanwhile, referring to FIG. 9, in a first internal electrode 121" according to another exemplary embodiment in the present disclosure, the hole may be excluded from the first internal electrode 121' having the structure illustrated in FIG. 4.

Therefore, the first internal electrodes 121" disposed on the first dielectric layer 111 may have first and second lead portions 121f and 121g formed at both ends thereof, respectively, and extending so as to be connected to the first and second external electrodes 131 and 132, respectively, have groove portions 121b and 121c formed at both front ends thereof in a direction perpendicular to the fifth and sixth surfaces 5 and 6 of the capacitor body 110, respectively, and have at least one cut-out portions 121d and 121e formed in portions thereof exposed to the third and fourth surfaces 3 and 4 of the capacitor body 110, respectively.

In addition, shapes of the first and second cut-out portions 121d and 121e and the first and second groove portions 121b and 121c of the first internal electrode 121" are not limited to those illustrated in FIG. 9, and may be modified into various shapes.

Figure 5:
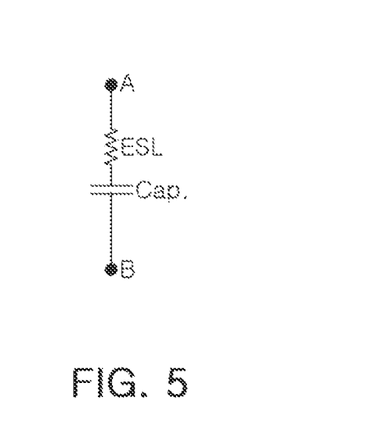
FIG. 5 is an equivalent circuit diagram of a dual cap-type multilayer capacitor according to the related art.
Figure 6:
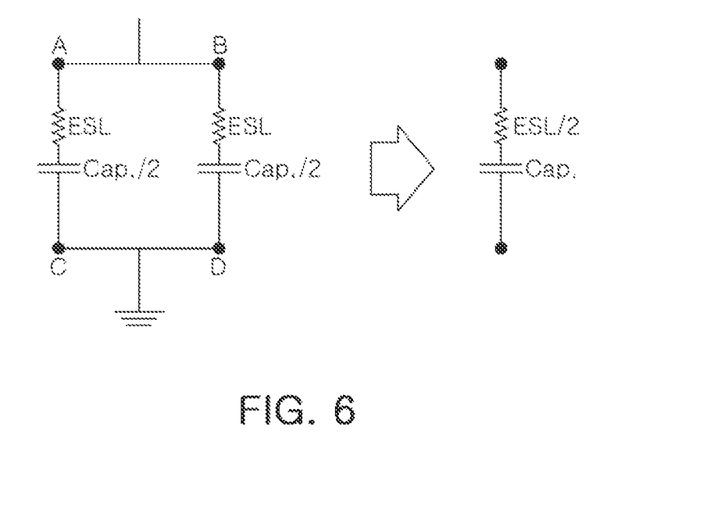
FIG. 6 is an equivalent circuit diagram of a multilayer capacitor having a three-terminal structure according to the related art.
Figure 7:
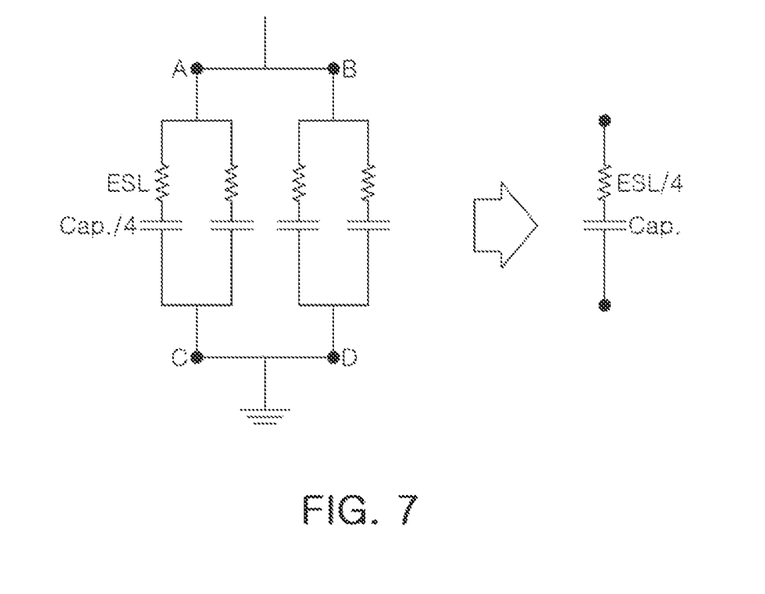
FIG. 7 is an equivalent circuit diagram of the multilayer capacitor according to an exemplary embodiment in the present disclosure.

FIG. 5 is an equivalent circuit diagram of a dual cap-type multilayer capacitor according to the related art, FIG. 6 is an equivalent circuit diagram of a multilayer capacitor having a three-terminal structure according to the related art, and FIG. 7 is an equivalent circuit diagram of the multilayer capacitor according to an exemplary embodiment in the present disclosure.

Among multilayer capacitors, a multilayer capacitor having a structure in which signal terminals are disposed on both end surfaces of a capacitor body and ground terminals are disposed on both side surfaces of the capacitor body in order to lower ESL has been disclosed.

In this case, both ends of a first internal electrode are exposed to third and fourth surfaces of the capacitor body to be connected to first and second external electrodes, which are the signal terminals, and a second internal electrode is exposed to fifth and sixth surfaces of the capacitor body and is connected to third and fourth external electrodes, which are the ground terminals.

In such a multilayer capacitor having a three-terminal structure according to the related art, it seems that dual capacitors are configured in parallel, and ESL may thus be reduced by half as compared with the dual cap-type multilayer capacitor in terms of an equivalent circuit, as illustrated in FIGS. 5 and 6.

In the present exemplary embodiment, the second and third internal electrodes formed on the second dielectric layer may be formed to be separated from each other, and the hole may be formed inside the first internal electrode formed on the first dielectric layer, such that capacitors may be formed in a parallel structure once more as compared with the multilayer capacitor having a three-terminal structure according to the related art in terms of an equivalent circuit, as illustrated in FIG. 7. Therefore, an effect of lowering the ESL by half as compared with the multilayer capacitor having a three-terminal structure according to the related art may be expected.

Figure 8:
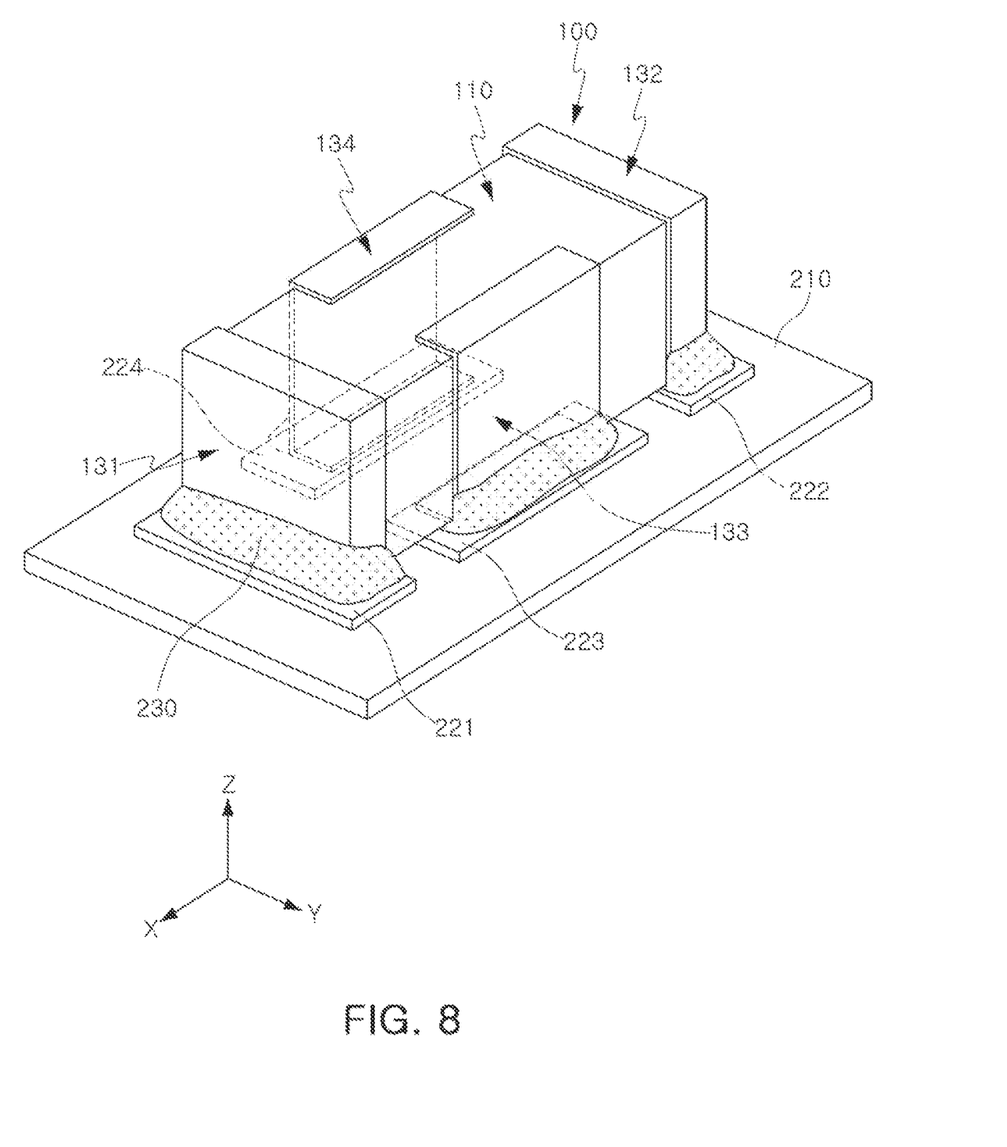
FIG. 8 is a perspective view illustrating a board in which the multilayer capacitor of FIG. 1 is mounted.

FIG. 8 is a perspective view illustrating a board in which the multilayer capacitor of FIG. 1 is mounted.

Referring to FIG. 8, a board having a multilayer capacitor according to an exemplary embodiment in the present disclosure may include a substrate 210 having first to fourth electrode pads 221 to 224 disposed on one surface thereof so as to be spaced apart from each other and a multilayer capacitor 100 mounted on one surface of the substrate 210 so that first to fourth external electrodes 131 to 134 thereof are connected to the first to fourth electrode pads 221 to 221 corresponding to the first to fourth external electrodes 131 to 134, respectively.

In FIG. 8, reference numeral 230 denotes a solder for bonding the electrode pad and the external electrode to each other.

As set forth above, in the multilayer capacitor according to an exemplary embodiment in the present disclosure, low ESL characteristics may be implemented.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a capacitor body including first and second dielectric layers, alternately stacked with a plurality of internal electrodes interposed therebetween, and including first and second surfaces opposing each other, third and fourth surfaces connected to the first and second surfaces and opposing each other in a length direction, and fifth and sixth surfaces connected to the first and second surfaces, connected to the third and fourth surfaces, and opposing each other;
first and second external electrodes disposed on the third and fourth surfaces of the capacitor body, respectively; and
third and fourth external electrodes disposed on the fifth and sixth surfaces of the capacitor body, respectively, such that portions of the fifth and sixth surfaces are uncovered by the third and fourth external electrodes, respectively,
wherein the internal electrodes include:
a first internal electrode, for connecting to a signal terminal, disposed on the first dielectric layer, having both ends connected to the first and second external electrodes, respectively, and having a hole;
a second internal electrode, for connecting to a ground terminal, disposed on the second dielectric layer so as to overlap a portion of the first internal electrode and be connected to the third external electrode; and
a third internal electrode, for connecting to the ground terminal, disposed on the second dielectric layer so as to overlap a portion of the first internal electrode, be spaced apart from the second internal electrode, and be connected to the fourth external electrode.

2. The multilayer capacitor of claim 1, wherein in the first internal electrode, the hole is elongated in a direction towards the third and fourth surfaces of the capacitor body.

3. The multilayer capacitor of claim 1, wherein a position in which the hole is disposed in the first dielectric layer and a position in which the second and third internal electrodes are spaced apart from each other on the second dielectric layer at least partially overlap each other in a direction in which the first and second dielectric layers are stacked.

4. The multilayer capacitor of claim 1, wherein the first internal electrode includes first and second lead portions disposed at both ends thereof, respectively, and extending to be connected to the first and second external electrodes, respectively.

5. The multilayer capacitor of claim 1, wherein the first internal electrode has first and second groove portions disposed at both front ends thereof, respectively, in a direction toward the fifth and sixth surface of the capacitor body.

6. The multilayer capacitor of claim 1, wherein the first internal electrode has at least one cut-out portion disposed in portions thereof exposed to the third and fourth surfaces of the capacitor body, respectively.

7. The multilayer capacitor of claim 1, wherein the first internal electrode has a cut-out portion disposed at at least one corner thereof.

8. The multilayer capacitor of claim 1, wherein the second internal electrode includes:
a first body portion overlapping a portion of the first internal electrode; and
a third lead portion extending from the first body portion toward the fifth surface of the capacitor body.

9. The multilayer capacitor of claim 1, wherein the third internal electrode includes:
a second body portion overlapping a portion of the first internal electrode; and
a fourth lead portion extending from the second body portion toward the sixth surface of the capacitor body.

10. The multilayer capacitor of claim 1, wherein the first and second external electrodes extend from the third and fourth surfaces of the capacitor body to parts of the first and second surfaces of the capacitor body, and
the third and fourth external electrodes extend from the fifth and sixth surfaces of the capacitor body to parts of the first and second surfaces of the capacitor body.

11. The multilayer capacitor of claim 1, wherein the first to fourth external electrodes include plating layers disposed on surfaces thereof, respectively.

12. The multilayer capacitor of claim 1, wherein the first internal electrode has the hole elongated toward the third and fourth surfaces of the capacitor body, and includes first and second lead portions disposed at both ends thereof, respectively, and extending to be connected to the first and second external electrodes, respectively.

13. The multilayer capacitor of claim 12, wherein the second internal electrode includes:
a first body portion overlapping a portion of the first internal electrode; and
a third lead portion extending from the first body portion toward the fifth surface of the capacitor body.

14. The multilayer capacitor of claim 13, wherein the third internal electrode includes:
a second body portion overlapping a portion of the first internal electrode; and
a fourth lead portion extending from the second body portion toward the sixth surface of the capacitor body.

15. The multilayer capacitor of claim 12, wherein the first and second external electrodes extend from the third and fourth surfaces of the capacitor body to parts of the first and second surfaces of the capacitor body, and
the third and fourth external electrodes extend from the fifth and sixth surfaces of the capacitor body to parts of the first and second surfaces of the capacitor body.

16. The multilayer capacitor of claim 1, wherein the hole is spaced apart from outer edges of the first internal electrode.

17. A board having a multilayer capacitor, comprising:
a substrate having first to fourth electrode pads disposed on an upper surface thereof; and the multilayer capacitor of claim 1 mounted on the substrate so that the first to fourth external electrodes are connected to the first to fourth electrode pads, respectively.

18. A multilayer capacitor comprising:

a capacitor body including first and second dielectric layers, alternately stacked with a plurality of internal electrodes interposed therebetween, and including first and second surfaces opposing each other, third and fourth surfaces connected to the first and second surfaces and opposing each other in a length direction, and fifth and sixth surfaces connected to the first and second surfaces, connected to the third and fourth surfaces, and opposing each other;

first and second external electrodes disposed on the third and fourth surfaces of the capacitor body, respectively; and third and fourth external electrodes disposed on the fifth and sixth surfaces of the capacitor body, respectively, such that portions of the fifth and sixth surfaces are uncovered by the third and fourth external electrodes, respectively, wherein the internal electrodes include:

a first internal electrode, for connecting to a signal terminal, disposed on the first dielectric layer, including first and second lead portions disposed at both ends thereof, respectively, and extending to be connected to the first and second external electrodes, respectively, having first and second groove portions disposed at both front ends thereof, respectively, in a direction towards the fifth and sixth surface of the capacitor body, and having at least one cut-out portion disposed in portions thereof exposed to the third and fourth surfaces of the capacitor body, respectively;

a second internal electrode, for connecting to a ground terminal, disposed on the second dielectric layer so as to overlap a portion of the first internal electrode and be connected to the third external electrode; and a third internal electrode, for connecting to the ground terminal, disposed on the second dielectric layer so as to overlap a portion of the first internal electrode, be spaced apart from the second internal electrode, and be connected to the fourth external electrode.

19. The multilayer capacitor of claim 18, wherein the at least one cut-out portion is disposed at at least one corner thereof.

20. The multilayer capacitor of claim 18, wherein the second internal electrode includes:

a first body portion overlapping a portion of the first internal electrode; and a third lead portion extending from the first body portion toward the fifth surface of the capacitor body.

21. The multilayer capacitor of claim 18, wherein the third internal electrode includes:

a second body portion overlapping a portion of the first internal electrode; and a fourth lead portion extending from the second body portion toward the sixth surface of the capacitor body.

22. The multilayer capacitor of claim 18, wherein the first and second external electrodes extend from the third and fourth surfaces of the capacitor body to parts of the first and second surfaces of the capacitor body, and the third and fourth external electrodes extend from the fifth and sixth surfaces of the capacitor body to parts of the first and second surfaces of the capacitor body.

23. The multilayer capacitor of claim 18, wherein the second internal electrode includes:

a first body portion overlapping a portion of the first internal electrode; and a third lead portion extending from the first body portion toward the fifth surface of the capacitor body, and the third internal electrode includes:

a second body portion overlapping a portion of the first internal electrode; and a fourth lead portion extending from the second body portion toward the sixth surface of the capacitor body.

24. The multilayer capacitor of claim 18, wherein the hole is spaced apart from outer edges of the first internal electrode.

* * * * *